(12) United States Patent
Clary et al.

(10) Patent No.: US 8,878,680 B2
(45) Date of Patent: Nov. 4, 2014

(54) LITTER BOX CLEANUP MONITOR

(76) Inventors: Debby Clary, Lafayette, CA (US); Guy McIlroy, Los Gatos, CA (US); Bruce C. Lundeen, Fremont, CA (US); Marjorie Lundeen, legal representative, Fremont, CA (US)

( * ) Notice: Subject to any disclaimer, the term of this patent is extended or adjusted under 35 U.S.C. 154(b) by 70 days.

(21) Appl. No.: 13/494,718

(22) Filed: Jun. 12, 2012

(65) Prior Publication Data

US 2012/0313786 A1 Dec. 13, 2012

Related U.S. Application Data

(60) Provisional application No. 61/496,495, filed on Jun. 13, 2011.

(51) Int. Cl.
*G08B 23/00* (2006.01)
*A01K 1/01* (2006.01)

(52) U.S. Cl.
CPC .................................. *A01K 1/0107* (2013.01)
USPC ...................................... 340/573.3; 340/573.1

(58) Field of Classification Search
USPC ......................................................... 340/573.3
See application file for complete search history.

(56) References Cited

U.S. PATENT DOCUMENTS

| 5,515,812 | A | * | 5/1996 | Faust | 119/166 |
|---|---|---|---|---|---|
| 5,855,186 | A | * | 1/1999 | Larsen et al. | 119/166 |
| 6,041,737 | A | * | 3/2000 | Hennigan | 119/165 |
| 2011/0315084 | A1 | * | 12/2011 | Miller | 119/166 |
| 2012/0299731 | A1 | * | 11/2012 | Triener | 340/573.1 |

* cited by examiner

*Primary Examiner* — Kerri McNally
(74) *Attorney, Agent, or Firm* — Larisa Migachyov

(57) ABSTRACT

A litter box cleanup monitor, comprising a sensor module that is triggered when an animal uses the litter box, a transmitter that transmits a signal, and a notification device that alerts the user when the litter box has been used. The notification device can be a dedicated device, a smartphone, or an Internet-connected computer. A plurality of notification devices may also be used.

9 Claims, 2 Drawing Sheets

LITTER BOX CLEANUP MONITOR

CROSS-REFERENCE TO RELATED APPLICATIONS

The present application claims the benefit of U.S. Provisional Patent Application No. 61/496,495, filed Jun. 13, 2011, which is hereby incorporated by reference in its entirety.

BACKGROUND OF THE INVENTION

1. Field of the Invention

The present invention relates to pet litter boxes, and in particular to a device and method for alerting the pet owner when the animal has used the litter box, to enable the owner to clean up the animal's deposit immediately to prevent an odor problem.

2. Description of the Prior Art

The problem of not-so-fragrant litter boxes is well known in the prior art, and many devices and methods exist for dealing with the odor issue. Some of the prior art focuses on the masking of odors by perfumes, or on absorption of odors by specially designed litter; some prior art devices automatically remove the deposit from the litter box immediately after use; some prior art devices are enclosed to prevent noxious odors from escaping, and include fans to ventilate the litter box. All of these devices are complex, cumbersome, and expensive.

Representative devices include U.S. Pat. No. 5,184,575 to Reinartz, which discloses a litter box that automatically cleans itself after each use by sliding the used cat litter into an airtight waste container and replenishing the litter box with fresh litter via an automatic refill device; U.S. Pat. No. 7,798,101 to Waters, which discloses a litter box shaped like a rotating drum that sifts any deposits out of the litter as the drum rotates; U.S. App. No. 2006/0137619 to Dodman et al., which discloses an automatic sprayer of an odor neutralizing or masking agent coupled with a motion sensor; U.S. Pat. No. 6,341,579 to Alkire et al., which discloses an exhaust and deodorizing system that has a fan that removes the air from a closed litter box and conveys it through a filter or a fragrance bar to deodorize it. Those, and numerous other similar devices, are complex, expensive, and not always effective.

SUMMARY OF THE INVENTION

The device and method of the present invention enables a pet owner to be alerted immediately after the animal has used the litter box, so that the pet owner can clean up any droppings immediately, before an odor problem develops. This avoids the complexities associated with self-cleaning litter boxes while still enabling near-immediate cleanup. The device of the present invention can attach to any type of litter box. The pet owner can be alerted by a notification device that provides a visual, audio, or any other type of alert, or by text message, email, Internet message, or phone call.

In one embodiment of the present invention, a sensor module, comprising a sensor and a transmitter, is placed on the litter box in such a way as to enable the sensor to sense the presence of a pet in the litter box or the presence of animal droppings in the litter box. Such a sensor can be a motion sensor, an odor sensor to detect a particular substance, a pressure sensor on the bottom of the litter box, a heat sensor, or any other sensor well known in the prior art that is capable of detecting the presence of either a pet or its droppings. When the sensor is triggered, the device transmits that information through the transmitter to a notification device, which activates an alert to let the pet owner know that it is time to clean the litter box. The alert can be visual, auditory, vibratory, or any other type of alert that can convey the information to the user. The present invention can also comprise multiple notification devices that can be placed at various locations inside or outside the user's home.

The sensor module can comprise various means of attachment to the litter box. In the preferred embodiment, the sensor module is shaped like an inverted U and hangs over the edge of the litter box. However, any other means of attaching the sensor module to the litter box is also possible, as long as it allows for a secure attachment that enables the sensor to work properly.

In an alternate embodiment of the present invention, the transmitter can transmit a signal to the user's cell phone, PDA, landline phone, or to the Internet, by means of a text message, IM message, Skype message, Facebook chat, phone call, Twitter update, or any other similar means of conveying information to the user. Since most people carry their smartphone with them wherever they are, and have other ways to get to the Internet ready at hand, it is a cheap and convenient way to alert the pet owner that it is time to clean the litter box.

Another embodiment of the present invention also comprises a means of distinguishing between "false alarms" (i.e. instances where the pet enters the litter box, but does not leave droppings) and real incidents that require cleanup by the user. For example, the sensor module can comprise multiple sensors, such as a motion sensor to detect when the pet enters the litter box and a chemical sensor to detect an odor arising from the droppings. In another embodiment of the invention, the sensor module could detect the difference between feces and urine in the litter box, for example by a chemical sensor that senses the presence of a gas present in feces but not in urine, or by a temperature sensor. This makes it more likely that the pet owner would only be notified when there is a real need for cleaning the litter box.

DETAILED DESCRIPTION OF THE PREFERRED EMBODIMENT

Figure 1:
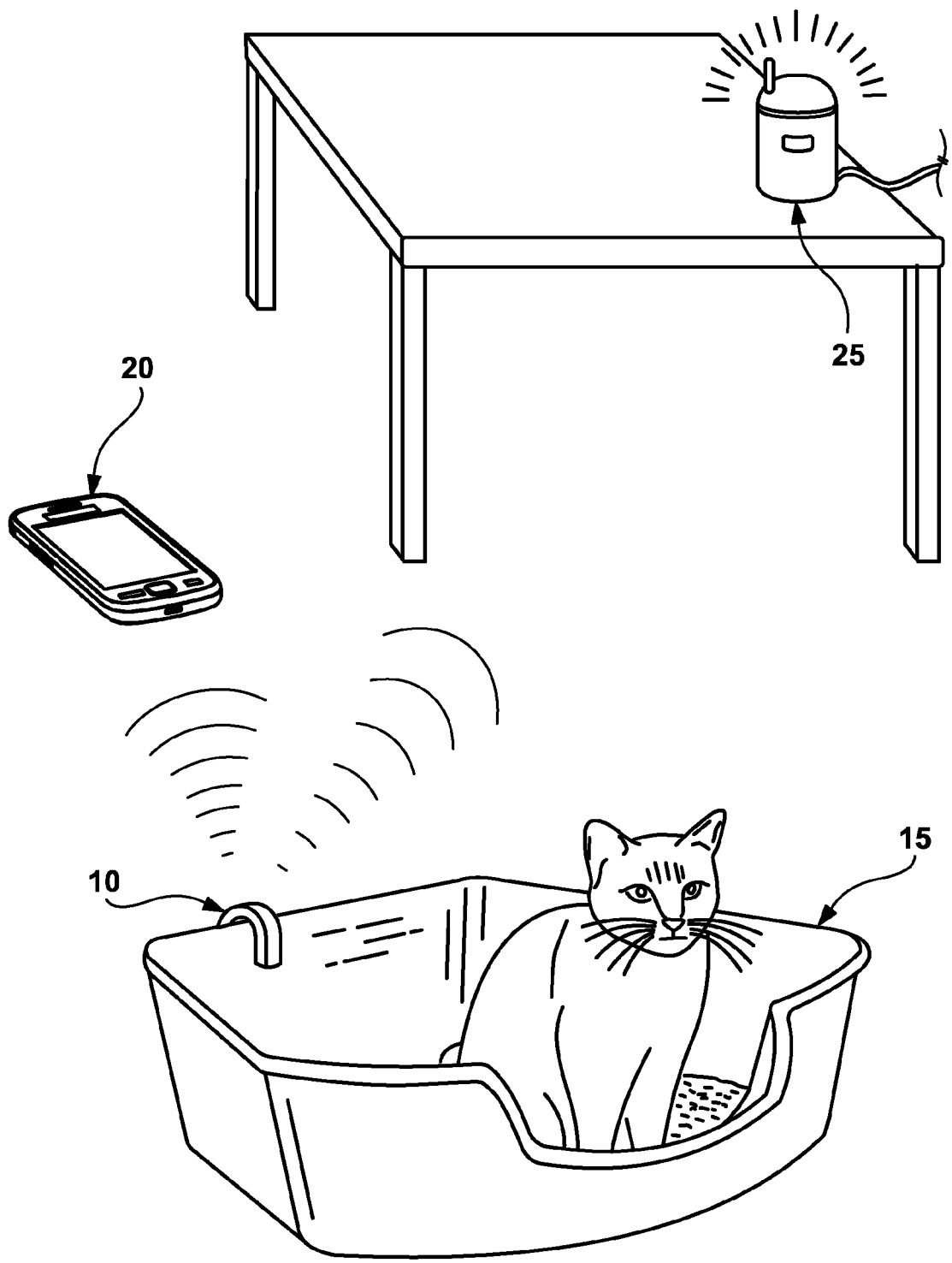
FIG. 1 shows one embodiment of the system of the present invention.

FIG. 1 shows one embodiment of the present invention. Sensor module 10 is attached to litter box 15. In the preferred embodiment of the present invention, sensor module 10 is shaped like an inverted U and hooked over the edge of the litter box 15. This enables the sensor to sense the presence of the animal, gases arising from the droppings (either feces or urine), or any other indications, and renders the sensor module easy to attach to any model of litter box.

In an enclosed litter box, sensor module 10 can be attached to the inner surface of the litter box by adhesives or by any other means that enable it to be attached securely and in a way that would not block the sensor.

Notification device 25 registers an alert when the sensor module 10 transmits a signal to it. The notification device 25 can be placed anywhere in the user's house or outside it, as long as it can receive a signal from the sensor module. There can be several notification devices positioned at different places within the user's house, to enable the user to receive litter box information regardless of the user's location. The sensor module 10 can also transmit a signal to the user's cell phone 20, either as a text message or as Internet data (i.e. email, Facebook chat, IM, Twitter update, and so on).

Figure 2:
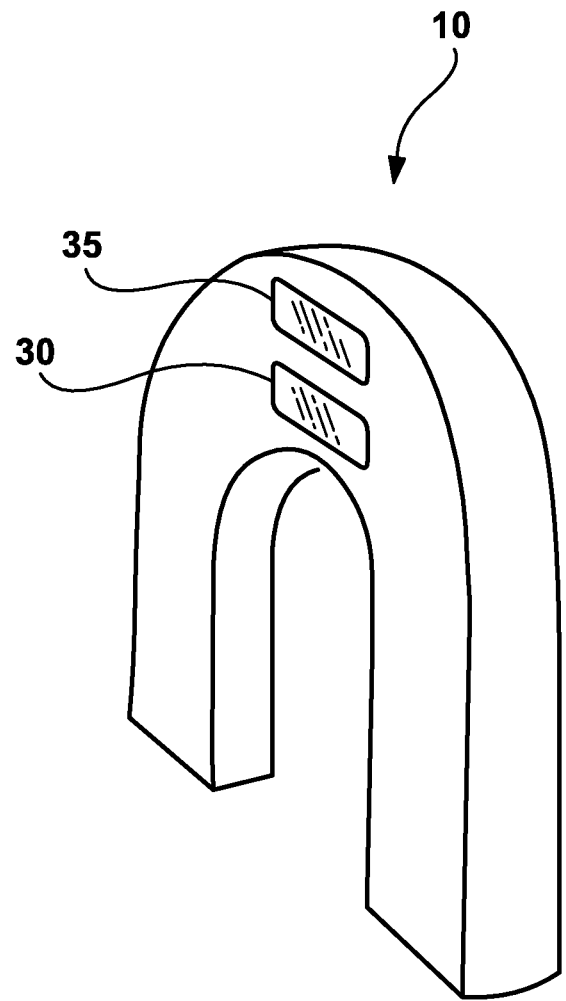
FIG. 2 shows the structure of one embodiment of the sensor module.

FIG. 2 shows a schematic representation of the structure of the sensor module 10. It comprises sensor 30 and transmitter 35. Sensor 30 reacts to the motion of the animal, or the odor of the droppings, or any other indications. Transmitter 35 then transmits that information to the notification device 25, or to the user's cell phone 20, or to the Internet, as shown in FIG. 1. The information can be transmitted by any transmission means known in the art such as Bluetooth, infrared, RF signals, or any other transmission means. Once the notification device 25 receives the signal from the transmitter 35, it registers an alert, either visually (i.e. lighting up, blinking, changing color), auditorially (emitting a beep or another sound), or by other means (i.e. vibrating).

The foregoing is considered as illustrative only of the principles of the invention. Since numerous modifications and changes will readily occur to those skilled in the art, it is not desired to limit the invention to the exact construction and operation shown and described. Accordingly, any suitable modifications and equivalents should be considered as falling within the scope of the invention.

The invention claimed is:

1. A litter box cleanup system, comprising:
   at least one notification device that displays an alert; and
   a litter box cleanup monitor, comprising:
   at least one sensor that can detect when an animal has defecated or urinated in a litter box; and
   a transmitter that transmits a signal to the at least one notification device, causing it to display an alert, when a sensor detects that an animal has defecated or urinated in a litter box;
   said litter box cleanup monitor shaped as an inverted U as to enable it to hang over the edge of a standard litter box; and
   said litter box cleanup monitor being portable.

2. The litter box cleanup system of claim 1, where the at least one notification device displays a visual alert.

3. The litter box cleanup system of claim 1, where the at least one notification device displays an auditory alert.

4. The litter box cleanup system of claim 1, where the at least one notification device is a smartphone.

5. The litter box cleanup system of claim 1, where the at least one notification device is a computer.

6. The litter box cleanup system of claim 1, where the at least one sensor can detect feces.

7. The litter box cleanup system of claim 1, where the at least one sensor is a chemical sensor.

8. The litter box cleanup system of claim 1, where the at least one sensor is a motion sensor.

9. The litter box cleanup system of claim 1, where the at least one sensor is a temperature sensor.

* * * * *